R. J. HARRIS.
SANITARY FLY CATCHER AND TRAP.
APPLICATION FILED SEPT. 8, 1919.

1,346,021.

Patented July 6, 1920.
2 SHEETS—SHEET 1.

WITNESS:
R. A. Thomas

INVENTOR.
BY R. J. Harris.
Victor J. Evans
ATTORNEY.

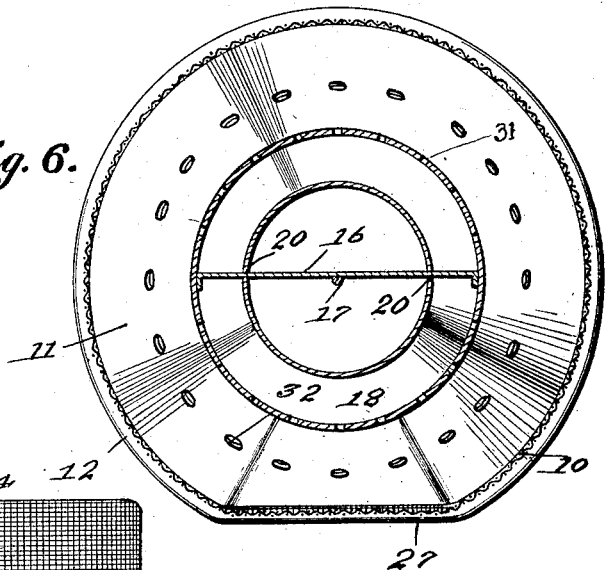
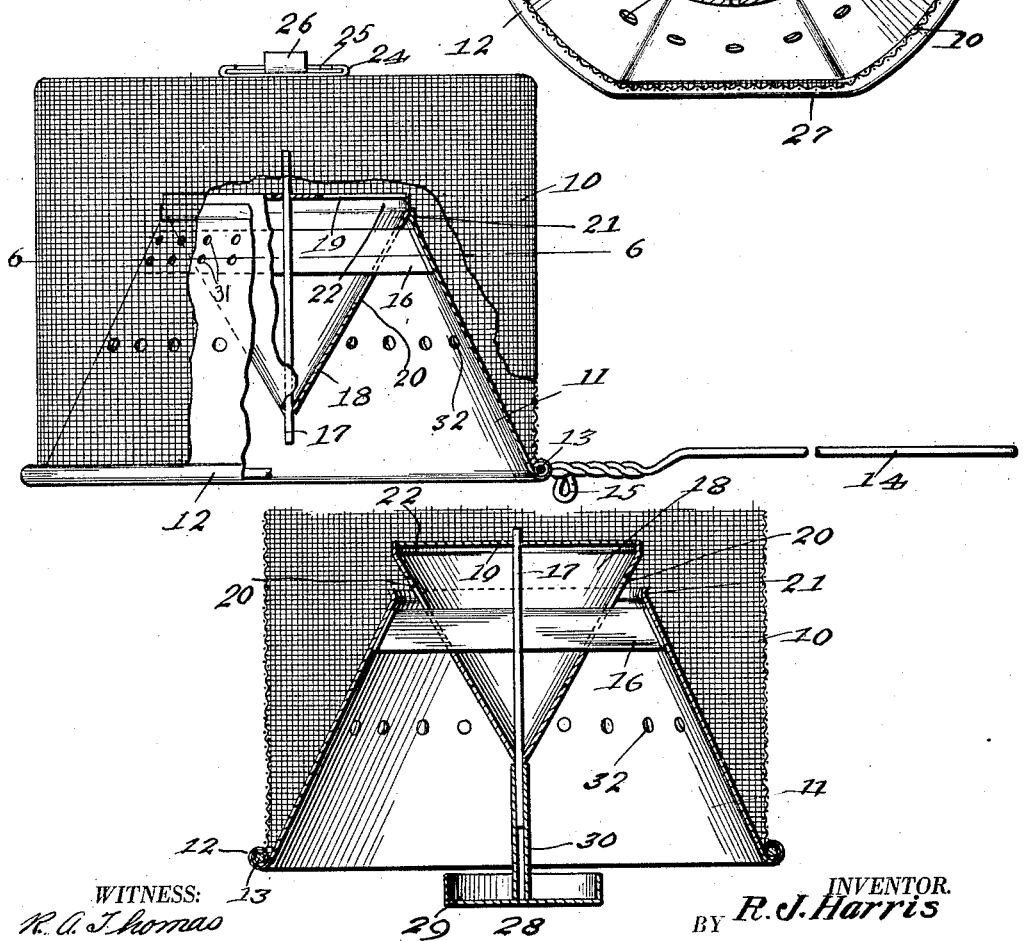

though it may also be made of other suitable materials.

UNITED STATES PATENT OFFICE.

RAYMOND J. HARRIS, OF CAMP TRAVIS, TEXAS.

SANITARY FLY CATCHER AND TRAP.

1,346,021.    Specification of Letters Patent.    Patented July 6, 1920.

Application filed September 8, 1919. Serial No. 322,294.

*To all whom it may concern:*

Be it known that I, RAYMOND J. HARRIS, a citizen of the United States, residing at Camp Travis, in the county of Bexar and State of Texas, have invented new and useful Improvements in Sanitary Fly Catchers and Traps, of which the following is a specification.

This invention relates to improvements in traps, especially designed for catching flies and similar insects.

An object of the invention is the provision of a trap, which may be either placed upon a support and baited to attract flies, or swung through the air above the fly to force the latter through the entrance opening into the trap.

Another object is to provide a trap, which when manipulated in the last named manner, will be automatically opened to admit the fly and then automatically closed to prevent its escape.

A further object is the provision of a trap having a novel arrangement of bait receptacle, which, in addition to forming a support for the trap, and a holder for the bait, also prevents closing of the entrance opening, so that flies may pass readily therethrough.

Other objects and advantages of the invention will appear as the following description is read in connection with the accompanying drawings.

In the drawings:

Fig. 4 is a side elevation with a portion of the trap broken away, the latter being shown in position when used in connection with a bait receptacle.

Fig. 5 is a fragmentary section taken centrally of the lower end of the trap and showing the manner of engagement with the bait receptacle, the entrance closure and the guide for the latter.

Fig. 6 is a horizontal section on the line 6—6 of Fig. 4.

Figure 2:
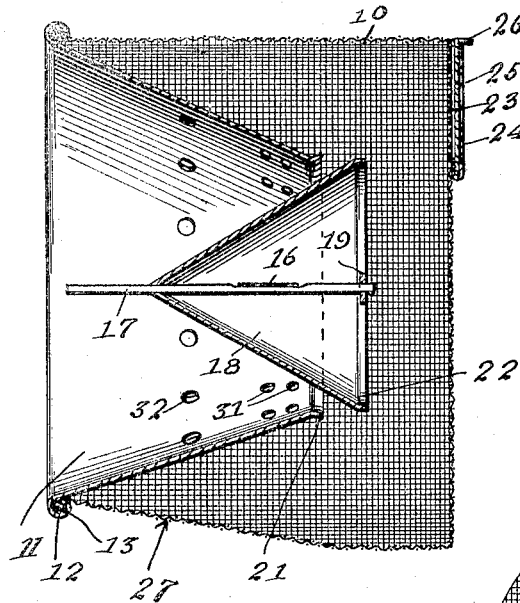
Fig. 2 is a sectional view on the line 2—2 of Fig. 1.
Figure 3:
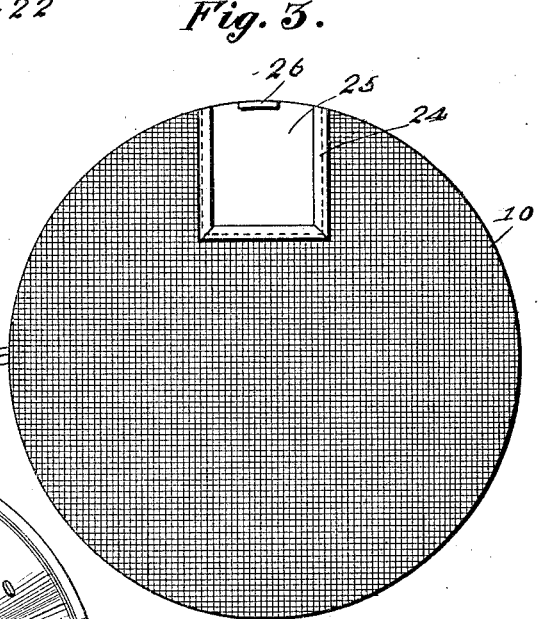
Fig. 3 is a plan view.
Figure 1:
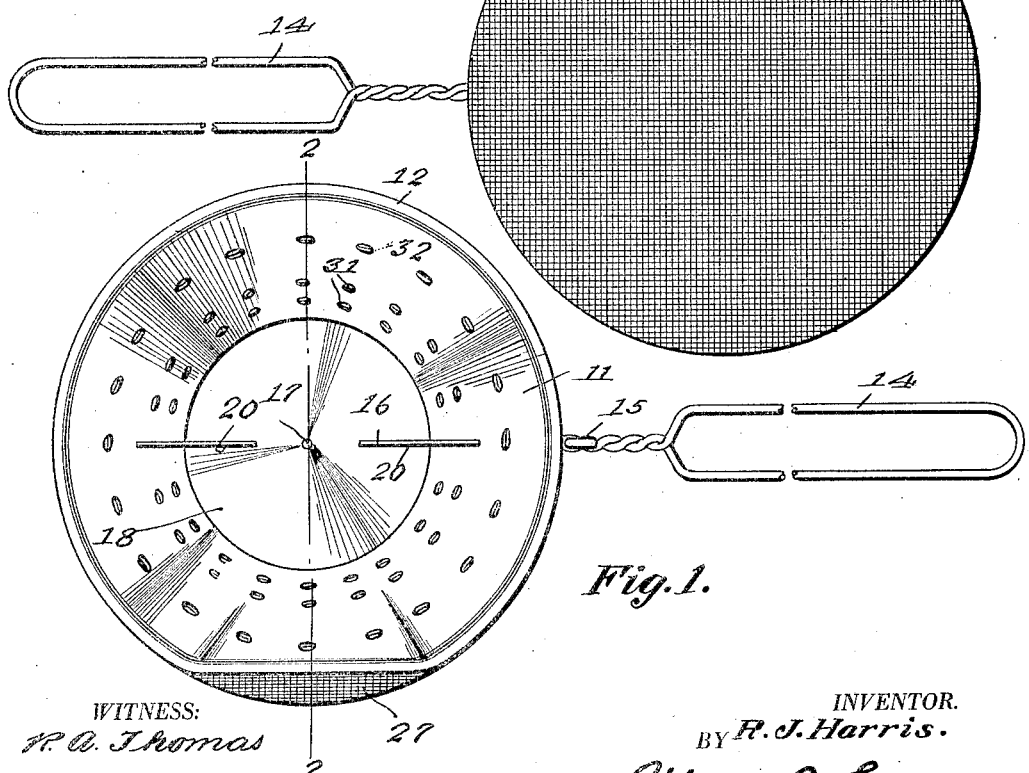
Figure 1 is an elevation of a trap embodying the present invention and looking into the open end.

Referring to the drawings in detail, wherein like characters of reference denote corresponding parts, the trap comprises a receptacle 10, which is preferably formed of wire and having a cylindrical shape. One end of the receptacle 10 is open and this opening is surrounded by an inwardly tapered frusto-conical member 11, the outer edge of which is provided with a bead 12. Located within this bead is a wire ring 13, which acts to stiffen the receptacle 10, the adjacent edge of the receptacle being bent or crimped around this ring and within the bead 12, so as to hold the said ring, the receptacle 10 and the member 11 together.

The ring 13 has its ends joined together and formed into a handle 14, which extends radially of the receptacle and is provided with a projection or foot 15, the purpose of which will be hereinafter explained.

Secured within the member 11 and extending diametrically across the same, is a plate or strip 16, the latter having in turn secured thereto a guide rod 17. This rod is disposed axially of the member 11 and receives thereon a preferably hollow cone-shaped closure 18, the apex of which is provided with an opening for the passage of the rod, while the said cone-shaped closure has extending from its base a strip 19, having an opening therein, which also receives the rod. The closure 18 is further provided upon diametrically opposite sides with elongated slots 20, for the passage of the plate or strip 16, the said slots being of a greater length than the width of the plate, so that the closure will have a limited axial movement with respect to the member 11. The member 11 is provided at its inner end with a flared extension or flange 21, which serves to stiffen the said member and to provide a seat for the closure 18, the latter being also flared or crimped, as indicated at 22, to stiffen this end of the closure, so that the latter will not become easily bent.

The receptacle 10 is provided opposite its open end with an opening or trap door 23, the latter being surrounded by a grooved frame 24, which slidably receives a closure plate 25, having a handle or finger piece 26 for the fingers of manipulation.

In the use of the trap as now explained, the said trap is grasped by the handle and swung toward and above a fly. This swinging movement will cause the closure 18 to slide rearward along the guide rod 17, until stopped by the plate or strip 16. The said closure will be then removed from its seat 21 and a fly passing into the frusto-conical member 11 will pass through the inner end of the said member between the seat 21 and the closure 18 and into the receptacle 10. As soon as the swinging motion ceases, the weight of the closure will cause the latter to travel forward along the rod 17 until it reaches the seat 21, so that the escape of the fly will be prevented. One side of the trap is preferably flattened, as indicated at 27, so that it may be swung closer to the article upon which the fly rests.

To increase the use of the trap, there is provided a bait receptacle 28, the latter consisting of a preferably circular pan 29, which carries a centrally and vertically extending sleeve 30. This sleeve is adapted to be placed over the outer end of the guide rod 17, the inner end of the sleeve contacting with the apex of the closure 18 and forcing the latter inward to open the receptacle. The trap is then placed upon a suitable support and rests upon the bait receptacle 28 and the foot 15, so that the open end of the trap is spaced from the support. The flies will then crawl beneath the trap, attracted by the bait and will travel upward through the opening and into the receptacle 10. To afford sufficient light beneath the receptacle to attract the flies, the frusto-conical member 11 is provided near its inner end with a double row of spaced openings 31 and preferably near its center with a row of spaced openings 32.

From the foregoing description and the accompanying drawings, it will be seen that the invention provides an exceedingly simple and efficient trap for the purpose of catching flies alive, the latter entering the trap or receptacle 10, where they may be immersed in hot water or subjected to sufficient heat to kill them, whereupon they may be emptied through the trap door 23. This provides a sanitary method of catching flies and eliminating mashing of the bodies upon fly swatters as now used and the consequent danger of contagion from the handling of these swatters.

Having described the invention, what is claimed is:

1. A fly trap comprising a receptacle having an entrance opening therein, a hollow frusto-conical member surrounding said opening and a reversely disposed conical closure movable axially of said member for controlling the opening.

2. A fly trap comprising a receptacle having an entrance opening therein, a hollow frusto-conical member surrounding said opening and an inverted cone shaped closure movable within said member for controlling the opening.

3. A fly trap comprising a receptacle having an entrance opening therein, a hollow frusto-conical member surrounding said opening, an inverted cone shaped closure movable within said member for controlling the opening, a guide rod for said closure and a combined closure stop and guide support passing through slots in said closure.

4. A fly trap comprising a receptacle having an entrance opening therein, a hollow frusto-conical member surrounding said opening, a closure movable axially of said member for controlling the opening, a guide rod secured to said member and passing through said closure and a bait receptacle removably secured to said rod.

5. A fly trap comprising a receptacle having an entrance opening therein, a hollow frusto-conical member surrounding said opening, a closure movable axially of said member for controlling the opening, a guide rod secured to said member and passing through said closure and a combined bait receptacle and support removably secured to said rod.

In testimony whereof I affix my signature.

RAYMOND J. HARRIS.